July 10, 1956　　　E. D. ANDERSON　　　2,753,905

NUTCRACKER

Filed May 8, 1953

INVENTOR.

ELDON D. ANDERSON

BY

McMorrow, Berman + Davidson

ATTORNEYS

United States Patent Office 2,753,905
Patented July 10, 1956

2,753,905
NUTCRACKER
Eldon D. Anderson, Eastland, Tex.
Application May 8, 1953, Serial No. 353,747
1 Claim. (Cl. 146—13)

This invention relates to nutcrackers and more particularly to a plier type nutcracker particularly arranged to peel the shells from nuts without breaking up the nut meats.

It is among the objects of the invention to provide an improved nutcracker in the form of a plier-like tool having opposed jaws one of which constitutes a claw for holding nuts in position for engagement by the other jaw, which other jaw constitutes a pointed implement for peeling the shell from a nut held by the claw; which is effective to peel the shell from a nut without exerting damaging pressure on the nut meats by splitting the shell and forcing the portions thereof outwardly away from the nut meat; which requires only moderate manual pressure for its operation; and which is simple and durable in construction, economical to manufacture, and easy to use.

Other objects and advantages will become apparent from a consideration of the following description and the appended claim in conjunction with the accompanying drawing wherein:

Figure 1:
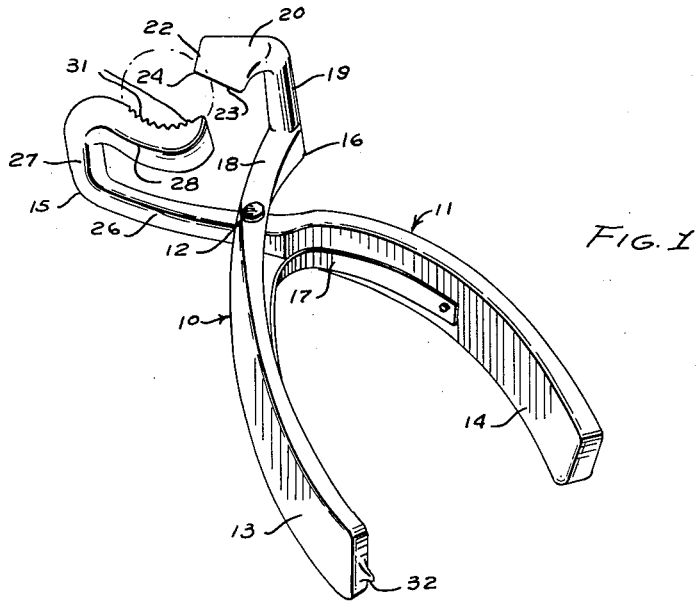
Figure 1 is a perspective view of a nutcracker illustrative of the invention.
Figure 2:
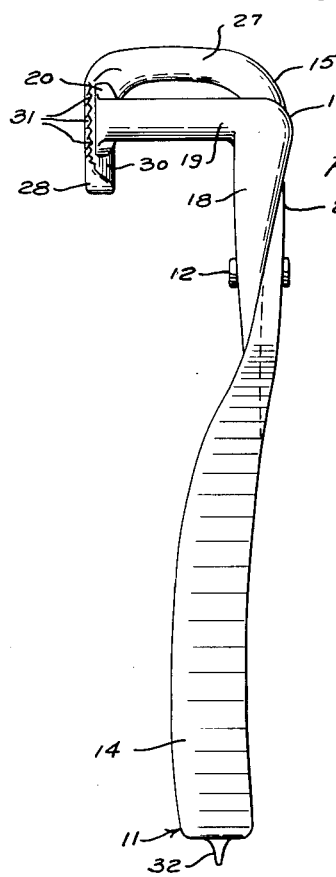
Figure 2 is a side elevational view of the nutcracker illustrated in Figure 1.
Figure 3:
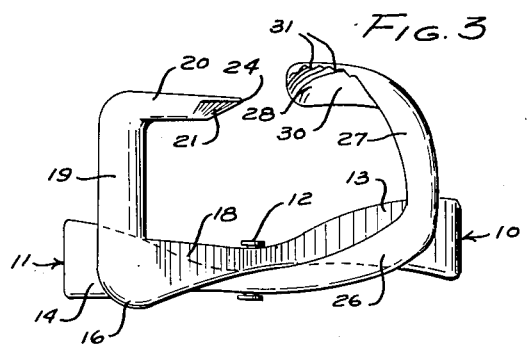
Figure 3 is a top plan view of the nutcracker as illustrated in Figure 2.

With continued reference to the drawing, the nutcracker comprises a pair of crossed over side members, generally indicated at 10 and 11, pivotally interconnected by a pivot pin 12 extending through registering apertures in the two side members at the location at which the side members are crossed over. The side members provide at one side of the pivot pin 12 a pair of longitudinally curved handles 13 and 14 concavely opposed to each other and at the opposite side of the pivot pin a pair of mutually opposed jaws 15 and 16. A U-shaped spring 17 is disposed between the handles 13 and 14 and is secured at its respectively opposite ends to the handles and bowed in a direction from its ends toward the pivot pin 12 and resiliently urges the handles 13 and 14 apart and the jaws 15 and 16 in a direction away from each other.

The jaw 16 comprises a portion 18 constituted by a longitudinal extension of the side member 10 from the handle 13 beyond the pivot pin 12, a portion 19 extending perpendicularly from the distal end of the portion 18 with its longitudinal center line substantially parallel to the axis of the pivot pin 12, and a portion 20 to define a flat blade extending perpendicularly from the end of the portion 19 remote from the portion 18 toward the opposite jaw 15. The jaw portion 20 is flattened and has its distal end beveled at the side thereof adjacent the portion 18, as indicated at 21, to provide at the distal end thereof straight edges 22 and 23 disposed at an angle to each other and intersecting at a point 24 disposed medially of the width of the end portion 20.

The jaw 15 is U-shaped and includes a first portion 26 constituted by a longitudinal extension of the side member 11 from the handle 14 beyond the pivot pin 12, a second portion 27 extending substantially perpendicularly from the distal end of the portion 26 with its longitudinal center line substantially parallel to the axis of the pivot pin 12 to define a base, and a laterally offset portion 28 spaced from and substantially parallel to the portion 26 and directly opposed to the end portion 20 of the jaw 16. The jaw portion 28 is beveled at its side nearest the portion 26, as indicated at 30, and is longitudinally curved to provide a longitudinally curved edge concavely opposed to the point 24 and cutting edges 22 and 23 of the end portion 20 of the jaw 16. The curved edge of the jaw portion 28 is serrated, as indicated at 31, longitudinally of this portion and constitutes a claw for holding a nut in position for engagement by the pointed end member 20 of the jaw 16.

With the above described arrangement, a nut can be held on the serrated edge of the claw 28 and the beveled and pointed end of the jaw 16 can be forced against the nut to remove a piece of the shell from the nut. The beveled and angular construction of the end portion 20 of the jaw 16 forces the piece of shell removed from the nut outwardly away from the nut meats, so that no damaging pressure is exerted against the nut meats. By moving the nut on the edge of the claw and repeatedly forcing the pointed end portion 20 of the jaw 16 against the nutshell, all of the shell can be peeled from the nut in successive sections without damaging the nut meats, so that the meats can be removed from the nut in a whole and undamaged condition.

A pick formation 32 is provided on the end of the handle 13 remote from the jaw 16 for assistance in splitting the nut meats in half and removing them from the inner structure of the nutshell.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A nutcracker comprising a pair of levers pivotally mounted with respect to each other at a point intermediate their ends, jaws carried on said levers adjacent one end thereof in opposed relation to each other and adapted for advance toward each other, one of said jaws including an upstanding post mounted on the associated lever and a flat blade carried by and extending laterally from adjacent the top of said post toward the other of said jaws, the other of said jaws including a base extending longitudinally from the associated lever, a claw fixedly carried by said base in superimposed spaced relation thereto and in axial alignment with said blade so that a nut disposed between said jaws will be held by said claw and have its shell pierced by said blade as the jaws are advanced toward each other, said blade having the sides thereof converging as they recede from said post to define a piercing point at the free end of the blade, said claw being longitudinally curved with the concavely curved edge thereof facing said blade, said concave edge having serrations thereon for gripping the nut placed between the jaws.

References Cited in the file of this patent
UNITED STATES PATENTS

| 888,738 | Proctor | May 26, 1908 |
| 2,133,529 | Benson | Oct. 18, 1938 |
| 2,204,040 | Himes | June 11, 1940 |
| 2,617,459 | Evans | Nov. 11, 1952 |
| 2,651,342 | Harless | Sept. 8, 1953 |

FOREIGN PATENTS

| 57,239 | Switzerland | June 27, 1911 |